(12) United States Patent
Shaffer et al.

(10) Patent No.: US 6,236,426 B1
(45) Date of Patent: May 22, 2001

(54) APPARATUS FOR LASER MARKING INDICIA ON A PHOTOSENSITIVE WEB

(75) Inventors: Wayne K. Shaffer, Penfield; David C. Press, Webster, both of NY (US); Gregory A. Smith, Fort Collins, CO (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/490,515

(22) Filed: Jan. 25, 2000

(51) Int. Cl.[7] .................................................. B41J 15/14
(52) U.S. Cl. ............................................. 347/241; 347/224
(58) Field of Search .................................... 347/241, 246, 347/236, 251, 253; 219/121.61, 121.73; 359/566, 888

(56) References Cited

U.S. PATENT DOCUMENTS

| | | | |
|---|---|---|---|
| 4,561,721 | * 12/1985 | Keilmann et al. | 359/566 |
| 5,609,780 | * 3/1997 | Freedenberg et al. | 219/121.73 |
| 5,940,115 | * 8/1999 | Nakamura et al. | 347/251 |

FOREIGN PATENT DOCUMENTS

04037079 * 2/1992 (JP).

* cited by examiner

*Primary Examiner*—N. Le
*Assistant Examiner*—Hai C. Pham
(74) *Attorney, Agent, or Firm*—Clyde E. Bailey, Sr.

(57) ABSTRACT

An apparatus for laser marking indicia on a moving photosensitive web substantially reduces fog spots on the web caused by impinging laser energy. A laser beam attenuating member arranged in the laser beam tube enables control of peak laser beam power thereby significantly reducing the incident of fog spots on the film surface.

6 Claims, 5 Drawing Sheets

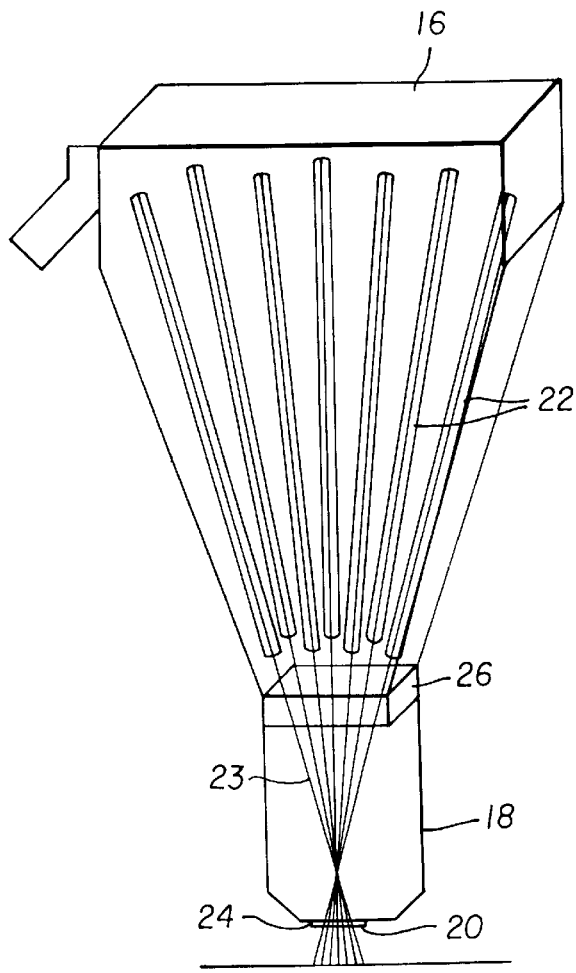
FIG. 2a
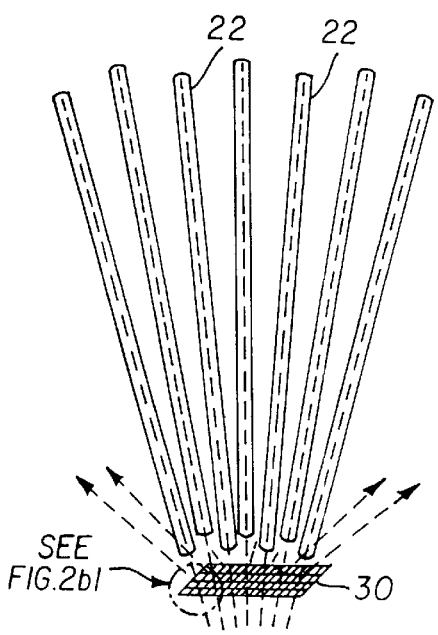
FIG. 2b
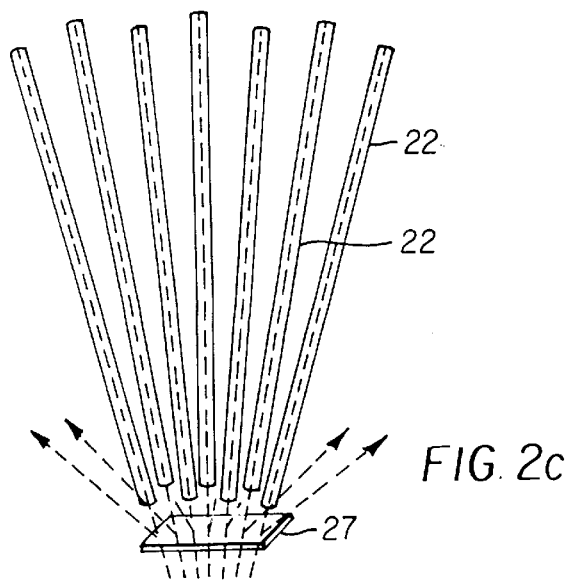
FIG. 2c
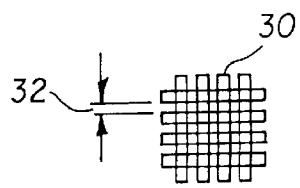
FIG. 2b1

APPARATUS FOR LASER MARKING INDICIA ON A PHOTOSENSITIVE WEB

FIELD OF THE INVENTION

The invention relates generally to the field of laser marking systems. More particularly, the invention concerns an apparatus that uses laser energy for marking indicia on photosensitive web with a dramatic reduction in the occurrence of fog on the photosensitive web.

BACKGROUND OF THE INVENTION

Conventional edge marking in photographic film manufacturing involves printing some sort of identification indicia along the edge of film rolls during the finishing operation. Edge marked film has direct verification of roll identity, sheet identity and waste identity during all stages of the manufacturing process. Importantly, edge marked film provides accurate footage identification that enables operators to quickly identify, trace and remove film imperfections, thereby minimizing the amount of product waste. More generally, edge marked film increases process understanding by allowing process interactions to be more closely identified with their corresponding effect on the product. Traditional embossing marking techniques are being replaced by laser edge marking. Current mechanical embossing techniques (embossing wheels) are not programmable, generate poor quality marks and require excessive maintenance. Laser edge marking, on the other hand, is particularly advantageous in the industry because it provides a permanent record and can be read before and after film processing.

Advances in laser technology enabled the use of a dot matrix $CO_2$ laser marking system to be used to replace existing embossing technology. Off the shelf laser marking equipment will mark the film at required throughput rate, however, an unacceptable level of fog spots occurred.

Thus, a particular shortcoming of these advanced high powered laser systems used for edge marking photosensitive film is that they produce a by-product that impinges on the film surface. Laser energy by-products in the form of a plume of energized smoke and irradiated debris on the film surface is known to cause the localized fogging on the film. Experience has shown that localized fogging is not easily eliminated even when the film is immersed in a 99.8% nitrogen atmosphere.

More recent developments in laser technology enabled the development of high speed marking systems using short pulse lasers. Short pulse laser exposure on photosensitive film shows some promise in reducing the occurrences of fog spots. Our experience also indicates that an air jet directed at the laser impingement point on the film surface further reduce the occurrence of fog. Statistical methods have been employed to gain information on fog incidence reduction when laser marking photosensitive film. It has been experimentally proven that laser pulse width does not have a significant effect on fog. Importantly, however, our experience does suggest that laser peak power has a dramatic effect on the reduction of occurrences of fog spots by a factor of about 30. In addition, significant statistical benefits can be derived from an air jet that we believe can further reduce the incidences of fog spots by a factor of about 10.

Hence, laser marking without controlling peak power will result in 14% to 50% of the laser-generated dots of dot matrix characters to have fog spots around the dots. There are no present attempts known to the inventors to control peak power in laser edge marking devices because embossing techniques still remain prevalent in the industry and, more importantly, the fog spots remain a significant quality issue during the finishing process.

Therefore, a need persists for variable information to be permanently marked on the edge of each sheet of photosensitive web, such as photographic film, without significant incidences of fog spots on the surface of the film.

SUMMARY OF THE INVENTION

It is, therefore, an object of the invention to provide an apparatus for laser marking indicia on a moving photosensitive web while substantially reducing the occurrence of deleterious fog spots on the photosensitive web.

It is another object of the invention to provide an apparatus for exposing a moving photosensitive web to laser energy while controlling the peak power of the laser energy.

Yet another object of the invention is to provide an apparatus for laser printing indicia on a photosensitive web by further directing a jet of air onto the laser energy impinged surface of the photosensitive web.

It is a feature of the invention that the apparatus for laser marking indicia on a moving photosensitive web has a means for controlling the output peak laser power to each of a plurality of lasers directed at the moving photosensitive web.

To accomplish these and other objects and features and advantages of the invention, there is provided, in one aspect of the invention, an apparatus for marking indicia on a moving photosensitive web, comprises:

a source of laser energy for producing a range of laser power;

laser printer means operably connected to said source of laser energy, said laser printer means being provided with a laser beam tube having an active end positioned proximate to said moving photosensitive web, a plurality of lasers disposed in said laser beam tube for generating a plurality of laser beams, a lens arranged in said laser beam tube for focusing each one of said plurality of laser beams along a predetermined optical path and into impinging contact with said moving photosensitive web thereby producing indicia thereon; and, means for controlling peak laser power to each one of said plurality of lasers.

It is, therefore, an advantageous effect of the present invention that laser edge markings on photosensitive web can be accomplished with an apparatus and method that is easy to operate, simple and cost effective to produce and that substantially reduces the occurrence of fog spots on the photosensitive web.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 2a is a front elevational view of the laser head showing an attenuating member therein;

FIGS. 2b and 2b are top elevational views of the mesh screen;

FIG. 2c is an isometric view of the beam splitter;

DETAILED DESCRIPTION OF THE INVENTION

Figure 1:
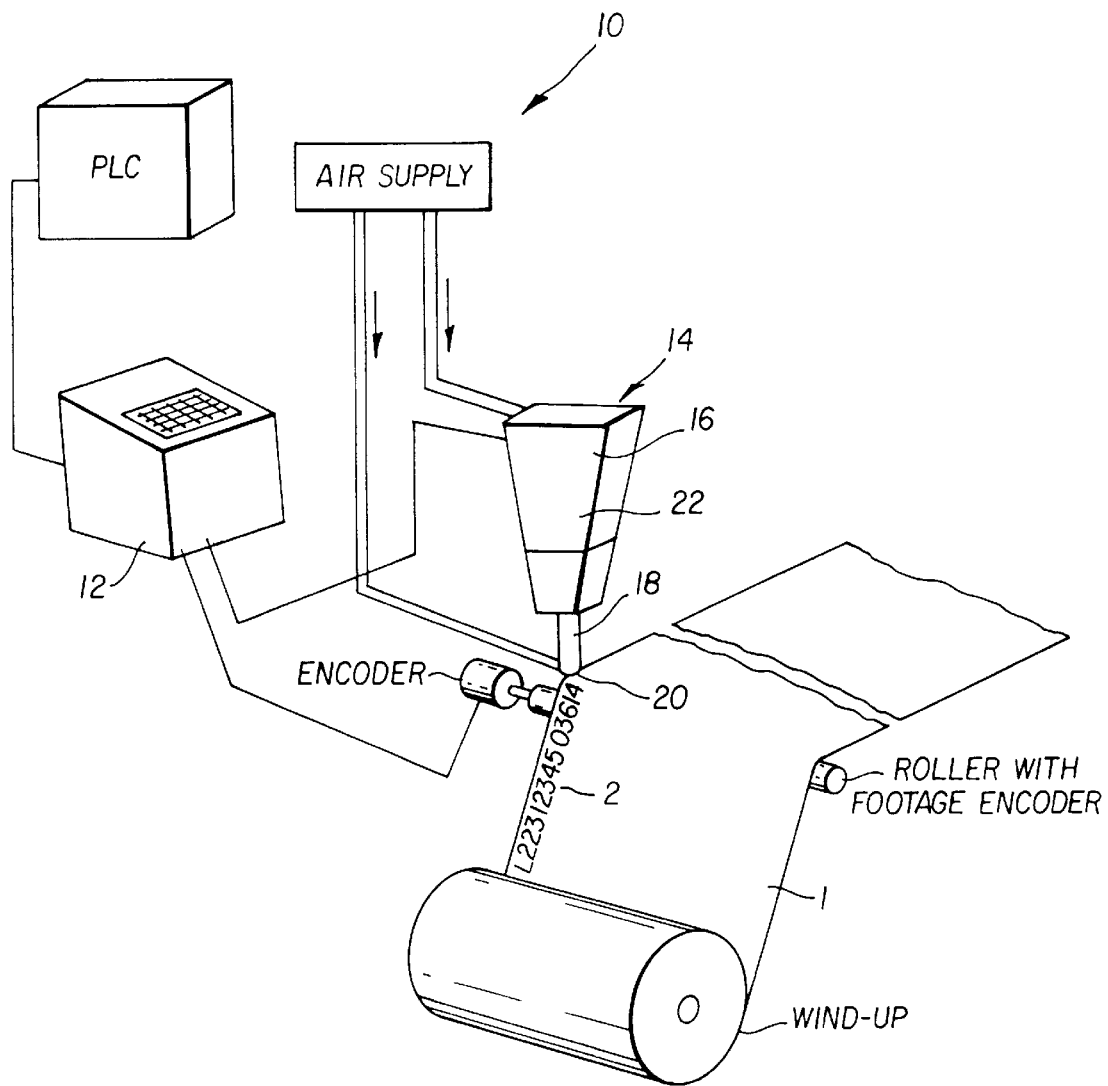
FIG. 1 is a schematic diagram of a laser edge marking system of the invention.

Turning now to the drawings, and in particular to FIG. 1, the apparatus 10 according to the principles of the invention for printing indicia 2 on a moving laser impingeable surface, such as a moving photosensitive web 1, is illustrated. According to FIG. 1, apparatus 10 has a source 12 of laser energy for producing a range of laser power. A laser printer means 14 is operably connected to the source 12 of laser energy.

Referring to FIG. 1, laser printer means 14, preferably a Domino DDC2 Digital Laser Coder, manufactured by Domino Lasers, Inc. of Gurnee, Ill., is provided with laser head 16 and a laser beam tube 18 structurally associated with the laser head 16. Laser beam tube 18 has an active end 20 positioned proximate to the moving photosensitive web 1 and a plurality of lasers 22 disposed in the laser beam tube 18 for generating a plurality of laser beams.

According to FIG. 2, in the preferred apparatus 10, seven lasers 22 are employed each being a medium power $CO_2$ laser that operates at about 30 watts maximum power. Each laser 22 corresponds to a row of dots in a dot matrix character. This type of laser 22 has enough power to mark small characters or indicia into photosensitive materials, for example emulsion coated film. At least one lens 24 is arranged in the laser beam tube 18 for focusing each one of the plurality of laser beams along a predetermined optical path 23 (FIG. 2a) and into impinging contact with the laser impingeable material, such as photosensitive web 1 thereby producing indicia thereon.

Referring to FIGS. 2a–2c, means for controlling peak power, preferably a laser beam attenuating member 26 (FIG. 2a), is disposed in the optical path 23 for attenuating the laser beams passing through the laser beam tube 18. In the preferred embodiment, laser beam attenuating member 26 is a metallic mesh screen 30 (FIG. 2b) arranged in the laser beam tube 18. Preferably, metallic mesh screen 30 is made of materials selected from the group consisting of brass, steel, copper, and metal alloys. We consider copper to be most preferred because it has more suitable thermal conductivity and reflective characteristics of the wavelengths contemplated by the invention. Moreover, the mesh screen 30 has a plurality of openings 32. Openings 32 each have a wire diameter in the range of from about 0.00025 inches (0.000635 cm) to about 0.025 inches (0.0635 cm) and a clear opening having a dimension in the range from about 0.001 inches (0.00254 cm) to about 0.100 inches (0.254 cm). In the preferred embodiment, mesh screen 30 has clear opening dimension of 0.055 inches (0.140 cm), and a wire diameter of 0.016 inches (0.041 cm).

As shown in FIG. 2c, alternatively, laser beam attenuating member 26 may include at least one beam splitter 27 arranged along the optical path 23 in the laser beam tube 18. Moreover, laser beam attenuating member 26 may include a neutral density filter (not shown).

Figure 3:
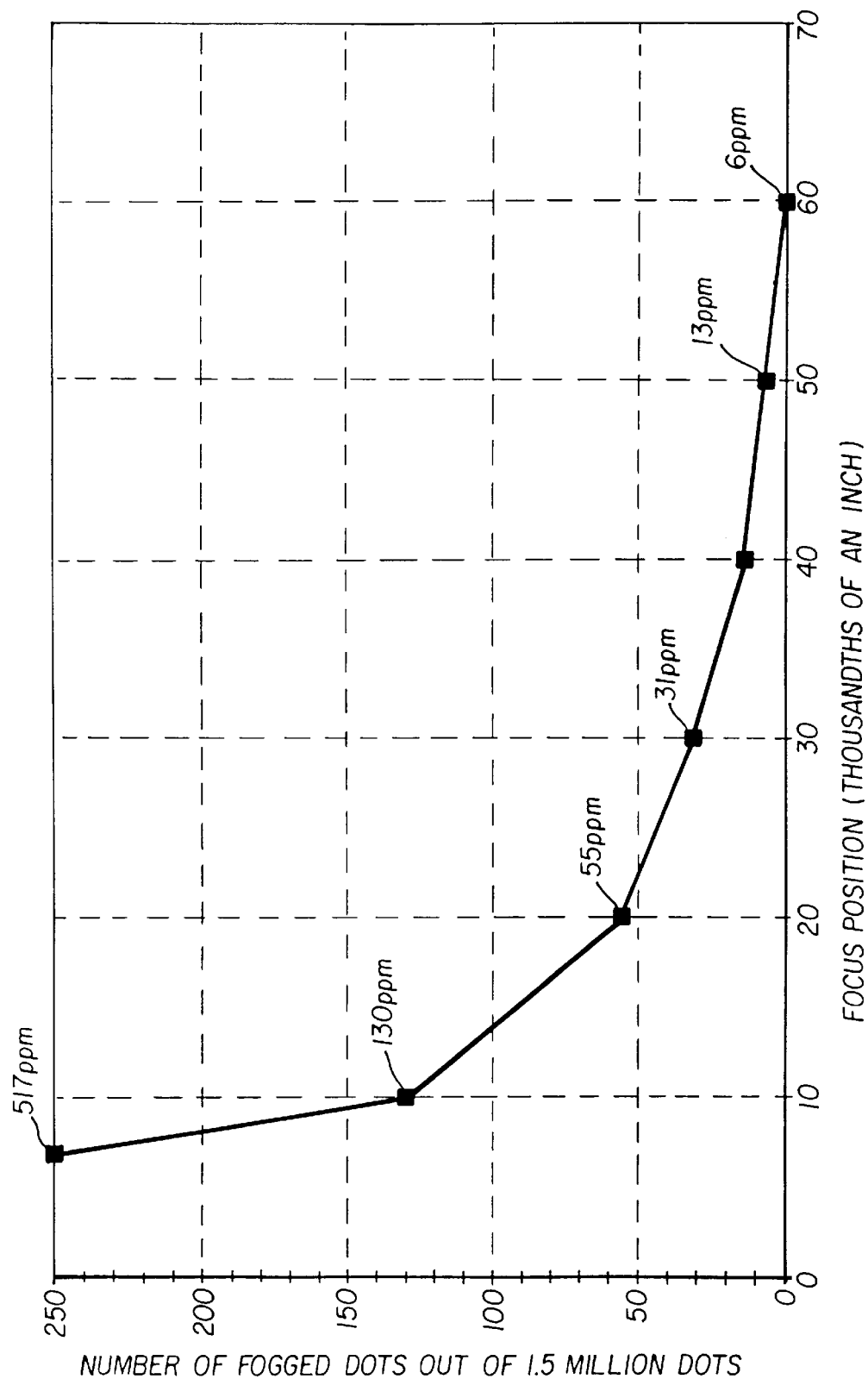
FIG. 3 is a graph of the relationship between focus position effect (inversely proportional to peak power) on fog spots formed on the photosensitive film; and, FIGS. 4 and 5 show the effects of an attenuating screen of the invention on incidents of fog spots.

Referring to FIG. 3, peak power of each of the plurality of lasers 22 was determined to be a primary factor controlling the incidents of fog spots occurring on the photosensitive web 1 after impingement by laser energy. According to FIG. 3, we observed that the incidents of fog spots decreased as the focus position of the lens moved further out of focus. This corresponded to an effective reduction in peak power that enabled the inventors to select controlling peak power for minimizing the incidents of fog spots.

Figure 4:
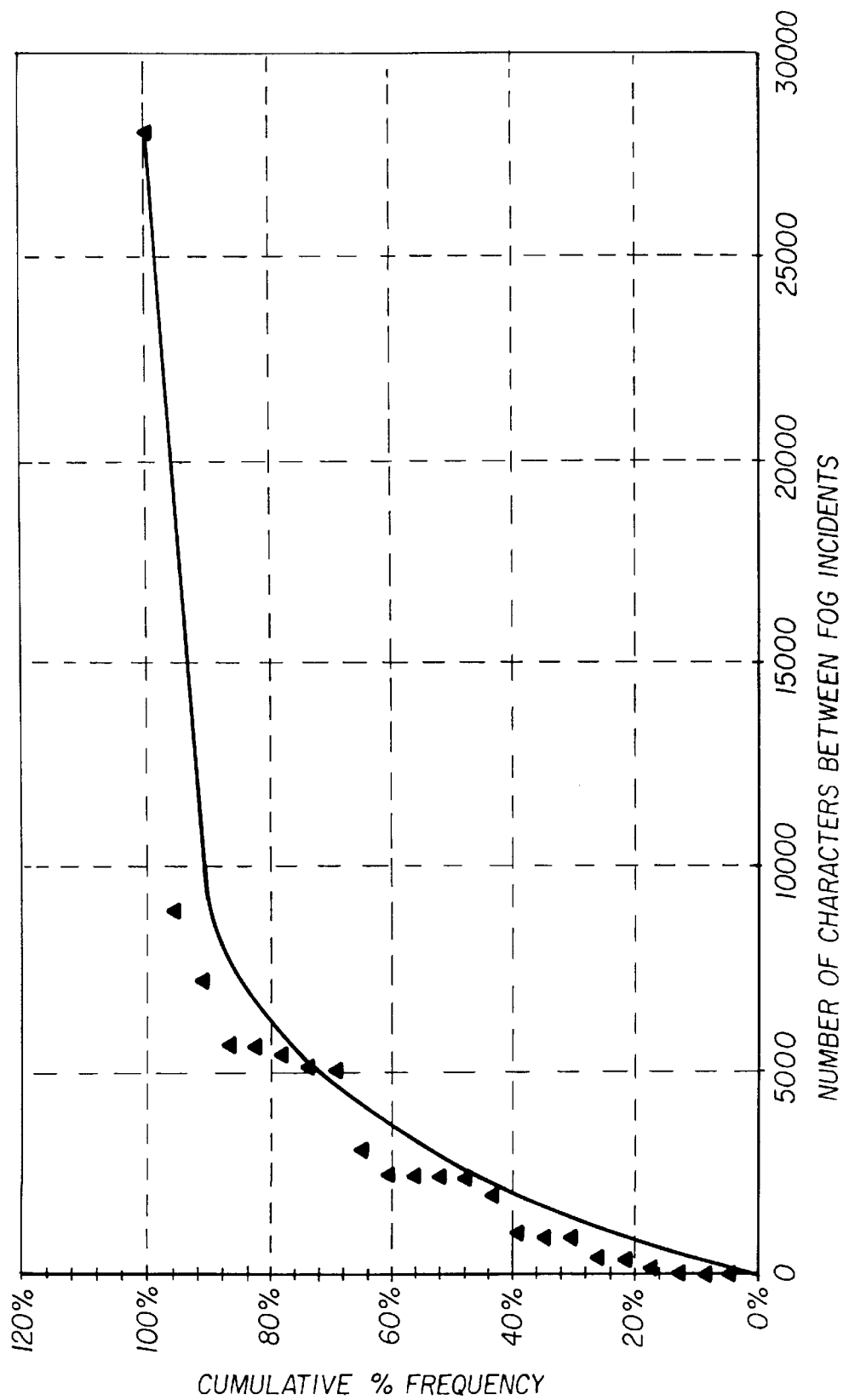
Figure 5:
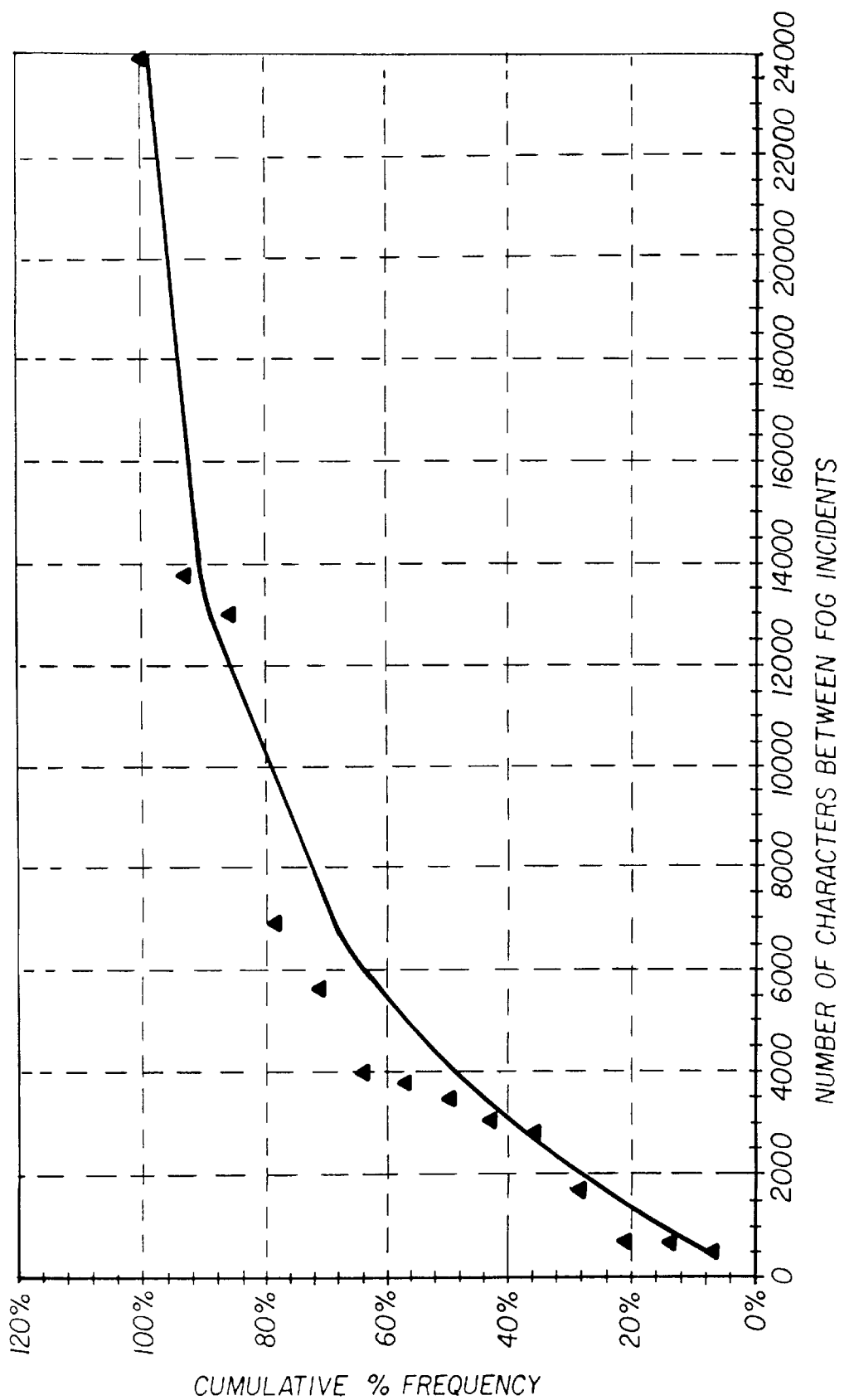

Referring to FIGS. 4 and 5, performance of mesh screens 30 used as laser beam attenuating member 26 in the apparatus 10 of the invention are illustrated. According to both FIGS. 4 and 5, the incidents of fog spots are well below expected levels generally experienced in the industry.

In another embodiment of the invention, a method of controlling peak power of a laser marking apparatus 10 adapted for marking predetermined indicia 2 on a moving photosensitive web 1 comprises the steps of providing a source 12 of laser energy. A laser printing means 14 (described above) is structurally connected to the source 12 of laser energy which has a laser head 16, a laser beam tube 18 connected to the laser head 16. As indicated above, the laser beam tube 18 has an active end 20 positioned proximate to the moving photosensitive web 1. A plurality of lasers 22 is disposed in the laser head 16 for generating a plurality of laser beams. A lens 24 is arranged in the laser beam tube 18, preferably near the active end 20, for focusing each one of the plurality of laser beams along a predetermined optical path 23 and into impinging contact with the moving photosensitive web 1 thereby producing indicia 2 thereon.

Further, the source 12 of laser energy is activated so as to energize each one of the plurality of lasers 22 for impinging laser beams forming predetermined indicia 2 on the moving photosensitive web 1. Importantly, the peak power to each one of the plurality of lasers 22 is controlled, as described above, for minimizing fog spots on the web 1.

The invention has been described with reference to a preferred embodiment. However, it will be appreciated that variations and modifications can be effected by a person of ordinary skill in the art without departing from the scope of the invention.

| PARTS LIST: | |
|---|---|
| 1 | photosensitive web |
| 2 | indicia |
| 10 | apparatus of the invention |
| 12 | source of laser energy |

-continued

PARTS LIST:

| | |
|---|---|
| 14 | laser printer means |
| 16 | laser head |
| 18 | laser beam tube |
| 20 | active end of laser beam tube 18 |
| 22 | lasers |
| 23 | optical path |
| 24 | lens |
| 26 | means for controlling peak power or laser beam attenuating member |
| 27 | beam splitter |
| 30 | mesh screen |
| 32 | opening in mesh screen 30 |

What is claimed is:

1. Apparatus for marking indicia on a moving photosensitive web, comprising:

a source of laser energy;

laser printer means operably connected to said source of laser energy, said laser printer means being provided with a laser head, a laser beam tube connected to said laser head, said laser beam tube having an active end positioned proximate to said moving photosensitive web, a plurality of lasers disposed in said laser head for generating a plurality of laser beams, a lens arranged in said laser beam tube for focusing each one of said plurality of laser beams along a predetermined optical path through said laser beam tube and into impinging contact with said moving photosensitive web thereby producing indicia thereon; and, means for controlling peak laser power to each one of said plurality of lasers, said means for controlling peak laser power being disposed in said laser beam tube and in said predetermined optical path.

2. The apparatus recited in claim 1 wherein said means for controlling peak laser power comprises a laser beam attenuating member for attenuating said plurality of laser beams.

3. The apparatus recited in claim 2 wherein said laser beam attenuating member comprises a metallic mesh screen.

4. The apparatus recited in claim 3 wherein said metallic mesh screen is made of materials selected from the group consisting of brass, steel, copper, and metal alloys.

5. The apparatus recited in claim 3 wherein said mesh screen has a plurality of openings, each one of said plurality of openings having a wire diameter in the range of from about 0.00025 inches (0.000635 cm) to about 0.025 inches (0.0625 cm) and a clear opening having a dimension in the range from about 0.001 inches (0.00254 cm) to about 0.100 inches (0.254 cm).

6. The apparatus recited in claim 3 wherein said mesh screen has a plurality of openings, each one of said plurality of openings having clear opening dimension of 0.055 inches (0.140 cm), and a wire diameter of 0.016 inches (0.041 cm).

* * * * *